United States Patent [19]

Duncan

[11] 4,287,853

[45] Sep. 8, 1981

[54] MILKING DEVICE

[76] Inventor: Lloyd P. Duncan, 3 Riverbend Pl., Washington, Mo. 63090

[21] Appl. No.: 133,313

[22] Filed: Mar. 24, 1980

[51] Int. Cl.$^3$ .................. A01J 5/04

[52] U.S. Cl. .................. 119/14.55

[58] Field of Search .................. 119/14.54, 14.55, 14.01, 119/14.05, 14.08, 14.18

[56] References Cited

U.S. PATENT DOCUMENTS

| | | | |
|---|---|---|---|
| 3,377,992 | 4/1968 | Baum | 119/14.08 |
| 3,726,253 | 4/1973 | Duncan | 119/14.18 |

*Primary Examiner*—Hugh R. Chamblee

*Attorney, Agent, or Firm*—Mason, Mason and Albright

[57] ABSTRACT

A milker has a lower base with a concave bottom and a lower exit under vacuum that can be closed by a float with valve until the milk level pivots and/or raises the float to open the exit. An enclosure body is fitted on the base and includes a main vacuum inlet and a milk inlet nipple positioned and angled to direct milk inflow at the side and/or below the float. An enclosure cap is releasably fitted on the top of the enclosure body and mounts an air valve, pulsation nipples and a further vacuum inlet. A central stem from the bottom extends up through a central passageway in the float and also through the cap to afford a fulcrum or support for an arm that pivots or slides to close the main vacuum inlet when the air valve is opened. The float can pivot and rise to a limited extent when milking or when the milker is inverted for washing. The assembled cap, enclosure body and base are interfitted and sealed when the inlets and milk outlet are in alignment. With the assembled milker, there is no milk backflow and the float acts as a baffle for milk inflow. When the milker is drained of milk, the float promptly valves the exit shut to preserve the vacuum.

15 Claims, 13 Drawing Figures

MILKING DEVICE

BACKGROUND OF THE INVENTION

This invention relates to an improved milker that can be used instead of the milker or receptacle 17 in the system described in U.S. Pat. No. 3,726,253. The same pulsator, teat cups, their connections and vacuum lines can be used and connected to the milker described herein. However, the receptacle float, its mounting and the relative location of the various nipples in the present invention are structured to improve the flow of milk during operation and to promote a more thorough washing as well as complete drainage. Also, the valving in the present receptacle represents an improved arrangement. This invention finds particular application in the dual vacuum system disclosed in U.S. Pat. Nos. 3,373,720 and 3,406,663 as well as the system of 3,479,008.

BRIEF DESCRIPTION OF THE DRAWINGS

In FIGS. 1–3, the milker 1 includes a lower base 3 which is preferably metal, such as stainless steel, and an upper enclosure body 5 which is preferably clear plastic. The enclosure body 5 is readily separable from the base 3 and an air divider cap 7 is releasably fitted on the enclosure 5. A milk exit 29 in the bottom of the base 3 ends in conduit 11 that is attachable to a vacuum hose for conducting milk to a bulk milk tank or other collector (not shown).

In FIG. 3, a chamber 8 is formed by the walls of the enclosure 5, the concave bottom wall 10 of base 3 and the cap 7. A hollow float 13 having a slot-shaped passageway 15 is loosely fitted on a stem 17 that projects upwardly from the bottom wall 10 through the cap 7 to a threaded end that receives a retaining nut 18. A yoke or handle 21 can be secured to the stem 17 below nut 18 as illustrated in FIG. 8. A strip-shaped guide 20 is slideably mounted on stem 17 with an elongated limb 22 that normally extends up into passageway 15.

Nipples 25 are connectable to hoses that lead from the teat cups (not shown) into the side walls of the enclosure 5 near the lower edge thereof and it can be seen from FIG. 9, that the inflow of milk through nipples 25 is mainly directed towards or below the sides of float

Figure 6:
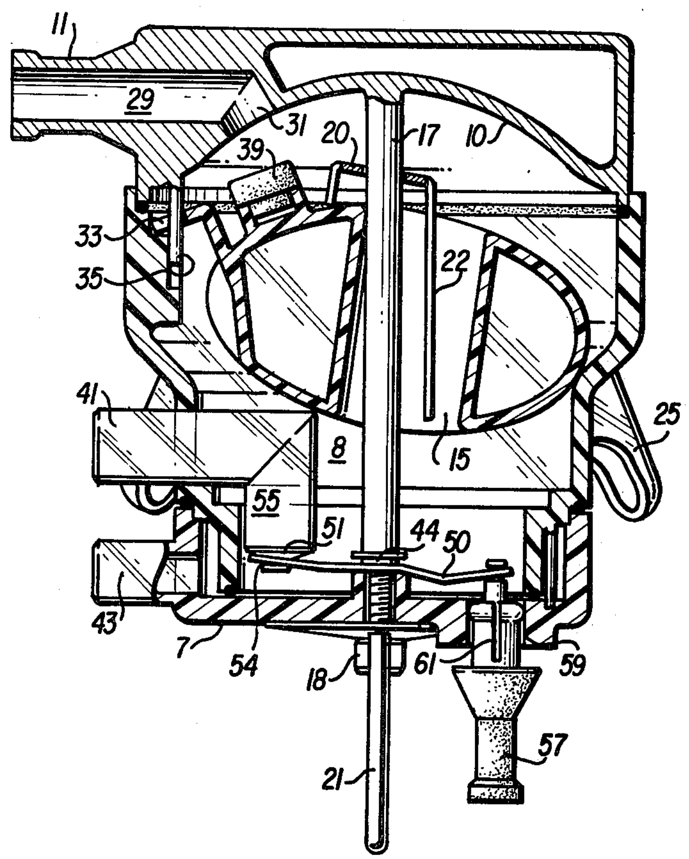
FIG. 6 is a section of the inverted milker in elevation corresponding to FIG. 3 with the float pivoted and air valve open.

13, at an angle to the concave bottom 10. The more or faster the milk entry through nipples 25, the higher the float 13 raises until its upper limit is reached as seen in FIG. 6 where the float contacts the reduced side portion of enclosure 5. Thus, milk flow tends to raise the float 13 rather than depress it during milking and float 13 also functions as a baffle for the inflowing milk. Therefore, chamber 8 can be of relatively small capacity, i.e. one quart or less, yet still not flood in use even with the fastest and highest producing cows (80 lb. or more).

Figure 9:
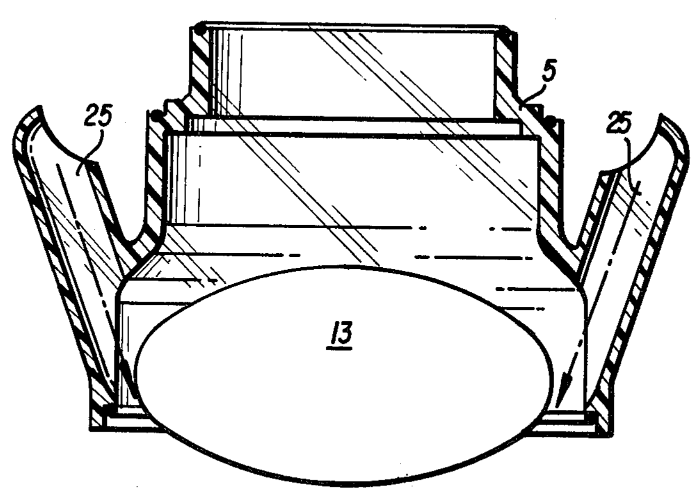
FIG. 9 is an elevation of the milker chamber in section showing the position of milk inlet nipples.
Figure 5:
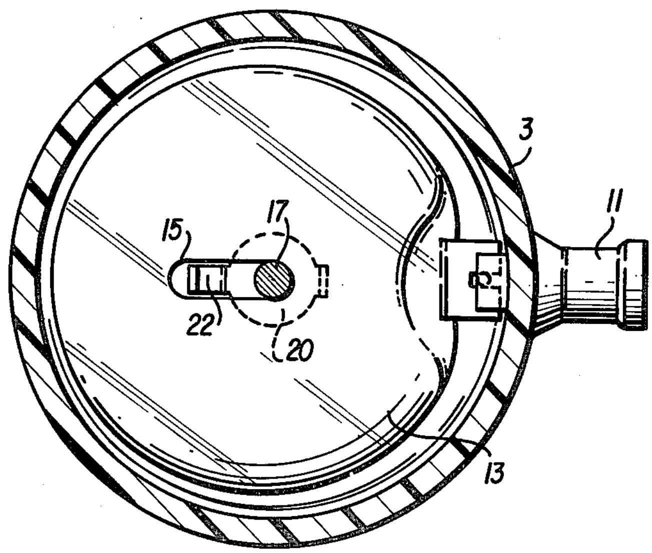
FIG. 5 is a sectional plan view of the milker chamber along the lines 5—5 in FIG. 3.

The float 13 is substantially circular when viewed in plan in FIG. 5 but decidedly oval when seen from aside in FIG. 9. The exit 29 and its seat 31 in bottom 10 are about one-half inch in diameter or equivalent which is adequate under normal milk line vacuum.

Figure 3:
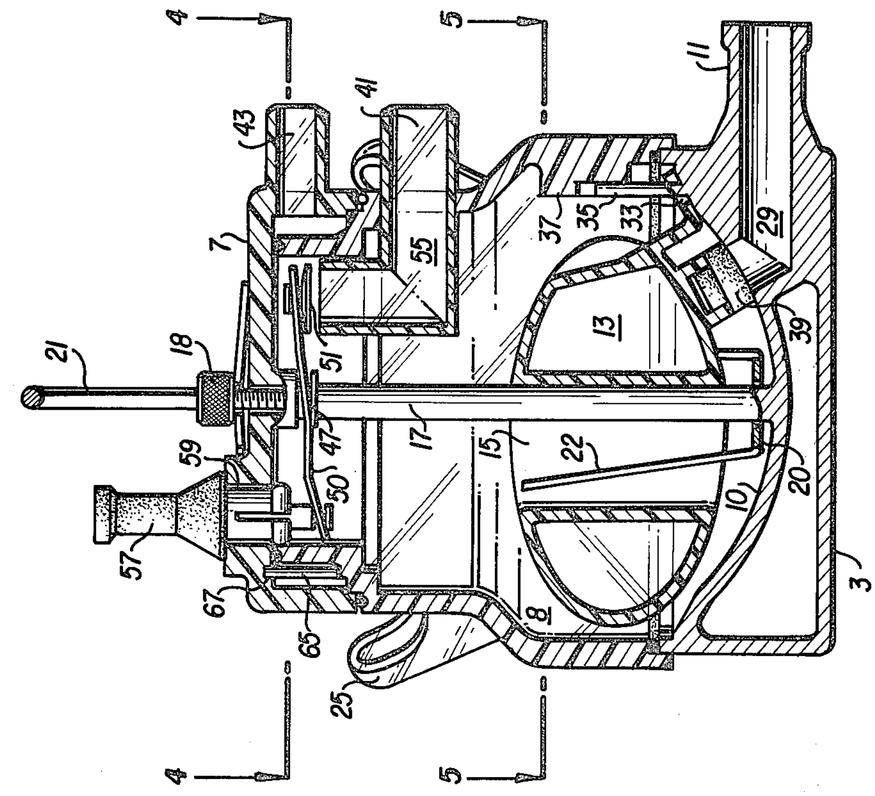
FIG. 3 is a section along the lines 3—3 of FIG. 2.

Float 13 has a side tab 33 which is notched open to receive a guide pin 35 mounted on base 3 so that the float can pivot up and down and ride up the pin 35 as well when milk inflow is substantial and when the milker 1 is inverted for washing and/or draining as seen in FIG. 6. As stated above, the upper portion of enclosure 5 is "necked down" to restrain or limit the pivoting of the float. The inner side wall of enclosure 5 also has a slotted boss 37 that receives pin 35 and aligns the enclosure 5 with respect to base 3 when assembled. At the lower side of float 13, a projecting valve 39 is positioned adjacent tab 33 to close seat 31, as best seen in FIG. 3, when milk has been drained from the milker 1 preserving the vacuum in exit 29.

Figure 2:
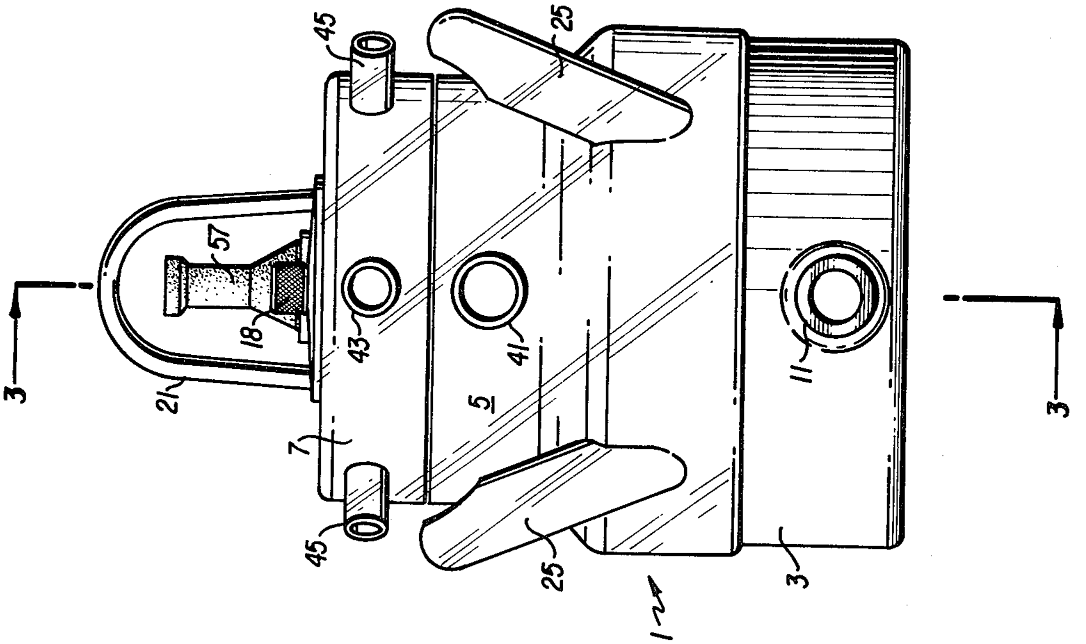
FIG. 2 is a front elevation of the milker.
Figure 1:
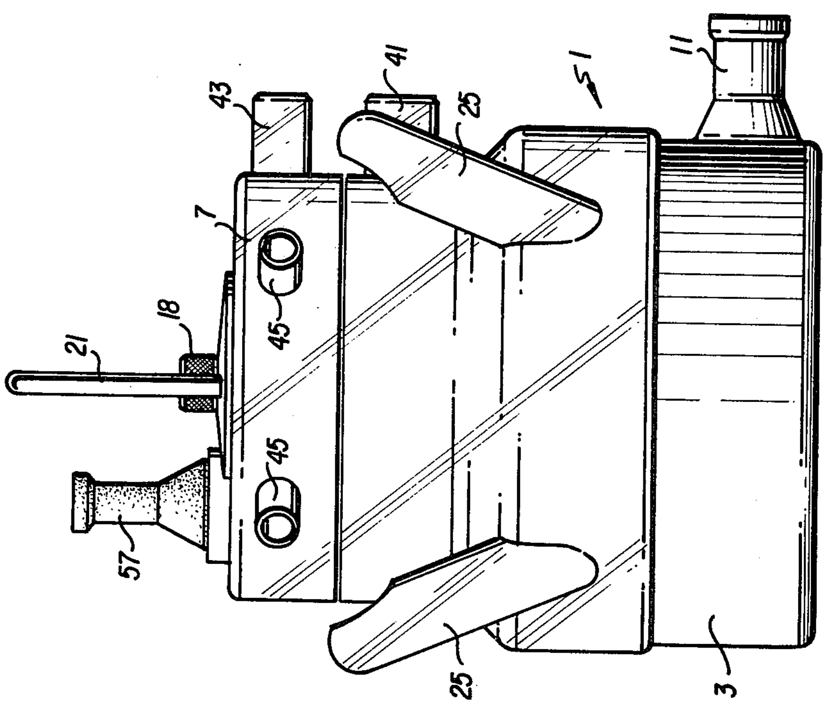
FIG. 1 is a side elevation of the milker.

The inverted washing position corresponds to FIG. 2 in my U.S. Pat. No. 3,726,253 and preferably the line connections are the same as in a dual vacuum system. Thus, conduit 11 in the instant drawings would be connected to high vacuum line 28 in '253, vacuum inlet 41 in enclosure 5 would be connected to a lower vacuum via line 25 in '253 and further or upper inlet 43 which is a pulsation line inlet in air divider cap 7, also would be connected to the lower vacuum via line 23 of '253 . Nipples 45 are connected to the teat cups through lines that correspond to 19 in '253 and nipples 25 herein can be attached to the milk lines 15 of '253 from the same teat cups.

Figure 8:
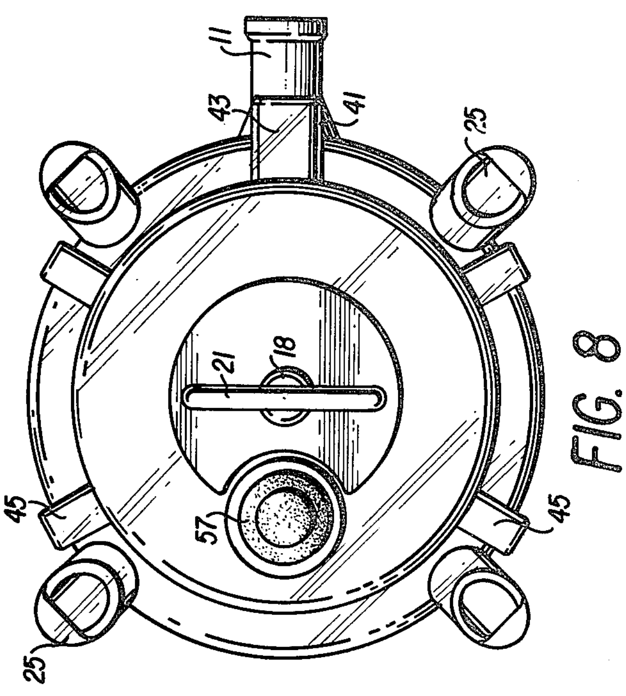
FIG. 8 is a top plan view of the milker.

It can be seen from FIG. 8 that the pulsator nipples 45 in cap 7 are offset with respect to nipples 25 in enclosure 5 so that when the pulsation and milk lines from the teat cups are being connected to the animal, there is a minimum of interference and "side push" is eliminated. Also, the ends of nipples 25 are rounded so that the corresponding hoses shut when the teat cups are being put on the animal. Cap 7 interfits with the remainder of enclosure 5 so that inlets 43 and 41 are in alignment with one another as well as conduit 11 when seen in plan. The interfitting edges of cap 7, enclosure 5 and base 3 have gaskets or O rings to seal when the milker 1 is assembled.

As best seen in FIGS. 3 and 6–8, the center of cap 7 has an interior stud 47 that has a central hole 71 through which stem 17 passes. The yoke 21 includes a holed flat plate and the threaded end of stem 17 extends through the plate of yoke 21 to receive retaining nut 18. The stud 47 is circular and has a reduced section 44 that is releasably fitted in the slot 49 of a rockable arm 50. One end of arm 50 has a hole that loosely receives an upper recessed projection 54 of a disc-like valve 51 that seats on the inlet side of duct 55 leading from the male vacuum inlet 41 to chamber 8. The opposite end of arm 50 has a key hole 70 to loosely receive a recessed projection 56 of the lower end of air inlet valve 57. An indent 67 in the cap 7 is positioned to receive pin 65 of enclosure 67 for cap alignment when milker 1 is assembled.

Figure 7:
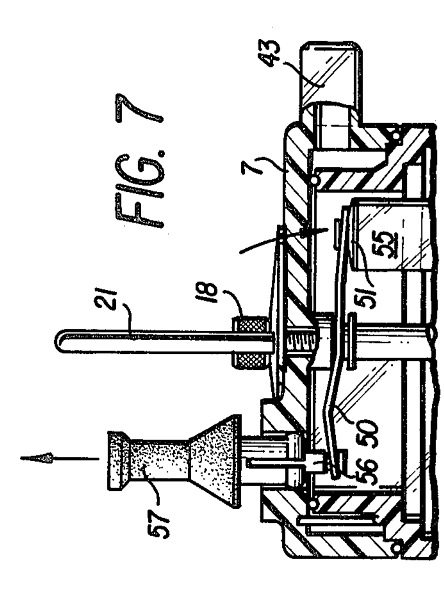
FIG. 7 is a side elevation sectional view of the milker cap.
Figure 4:
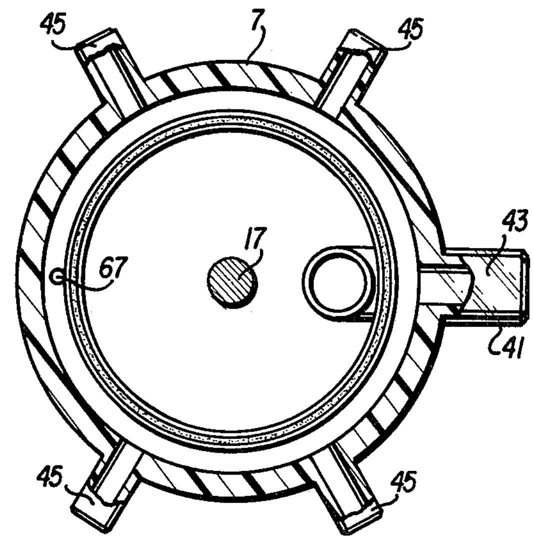
FIG. 4 is a sectional plan view of the milker cap along the lines of 4—4 in FIG. 3 with parts removed for clarity.
Figure 10:
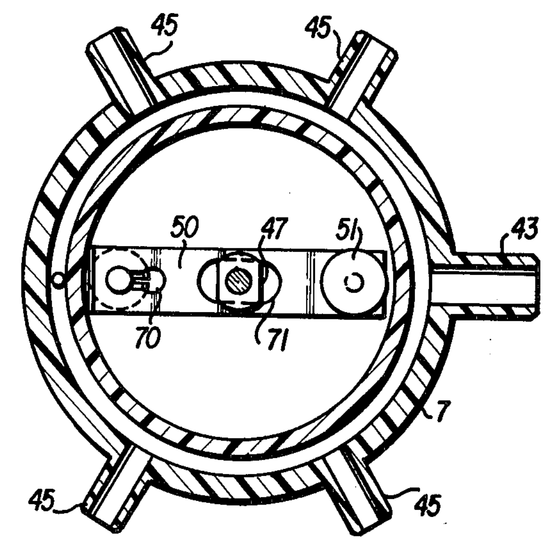
FIG. 10 is a bottom plan view of the cap.

Valve 57 normally rests on the top of cap 7 and closes air aperture 59 in the cap 7 when duct 55 is open (FIG. 3) and admits ambient air through slots 61 of valve 57 when valve 51 is pivoted to shut duct 55 (FIGS. 6 and 7). Thus, when the teat cups are to be removed from an animal, the vacuum in chamber 8 is broken by lifting valve 57 exposing slots 61 which admit ambient air through aperture 59. At the same time, arm 50 is rocked about reduced section 44 of stud 47 and valve 51 is pivoted and seated on conduit 55 preserving the vacuum in inlet 41 and attached vacuum line. The pulsation line fitted to inlet 43 partially shuts or can be shut as described in connection with FIG. 9 in Patent No. 3,726,253 when the milker is washed. Arm 50 can be removed from stud 47 by turning the arm 90° until the enlarged portion of hole 71 aligns with the enlarged side of the end of stud 47.

When milker 1 is inverted for washing and/or draining, the float 13 lodges against the walls of the enclosure 5 as seen in FIG. 6 and limb 22 of sliding guide 20 prevents the float from closing and stopping circulating of wash water so that return to seated position (FIG. 3) is ensured after the milker is returned to upright position. Aperture 59 is lowermost when the milker is inverted so that complete drainage takes place through aperture 59 and thus, valve 57 is self-cleaning.

The above described milker is compact and will fit under lowered uddered cows and also reach the wider udders with less leakage. The nipples 25 enter the lower portion of the milker but externally extend up far enough to prevent milk back-up into the vacuum lines attached to inlets 41 and 43.

Figure 11:
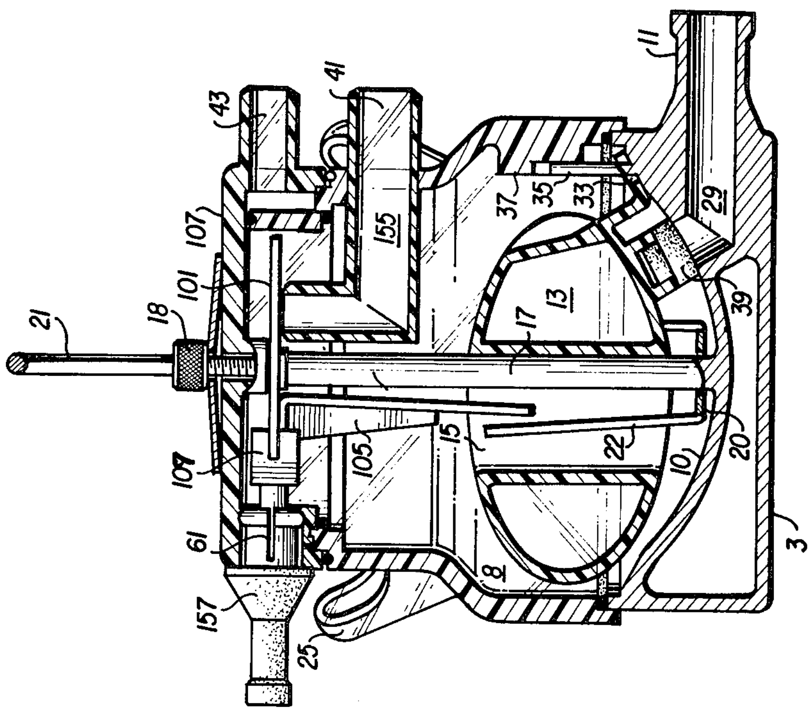
FIG. 11 is a section similar to that of FIG. 3 but with a modified air valve and cap.
Figure 13:
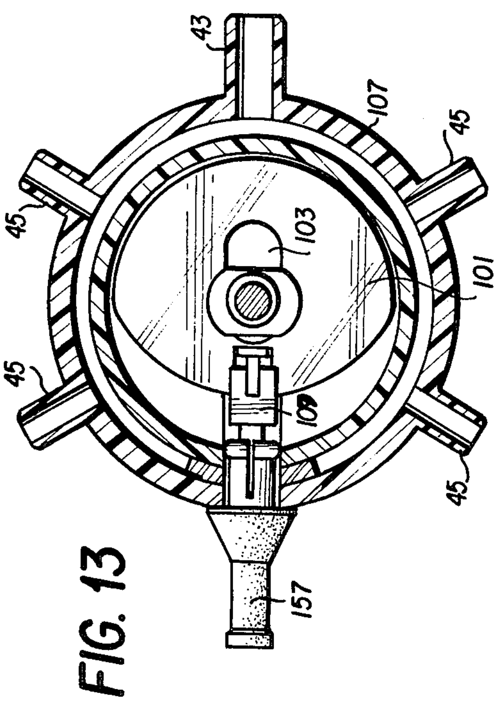
FIG. 13 is a bottom plan view of the modified air cap.
Figure 12:
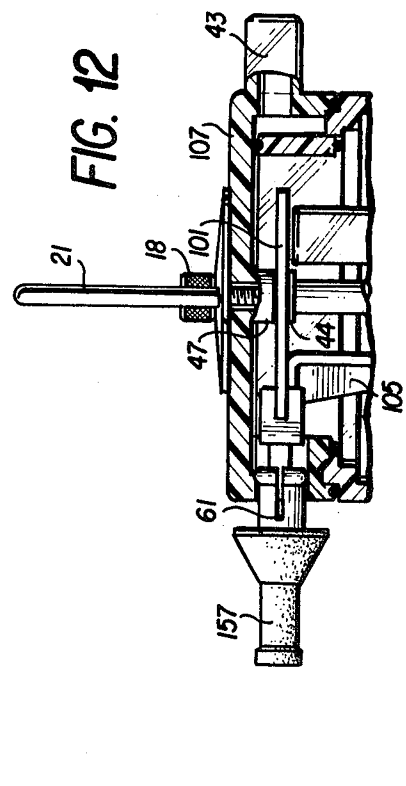
FIG. 12 is a side elevation sectional view of the modified air cap.

In FIGS. 11–13, a side mounted air valve 157 is shown in air cap 107 with the advantage that milk can be cleared from the unit following each milking. Similar parts to those in FIGS. 11–13 bear the same numbers as in FIGS. 1–10. Instead of a pivotable arm, the valve 157 is attached to a slide element 101 which opens or closes duct 155 in FIGS. 11 and 12 respectively. Elbow duct 155 is positioned closer to stem 17 than in the above described duct 55 but otherwise is the same. As seen in FIG. 13, slide 101 has a large oval-shaped opening 103 that receives recessed portion 44 of stud 47 and is slideably supported on the latter. When pulled outwardly as shown in FIG. 12, the valve slots 61 admit ambient air and opening 103 is moved on stud 47 from duct 155 so that slide 101 covers and closes the latter.

An extension 105 extends down from slide 101, adjacent connector 109, into passageway 15 of float 13 and affords an additional guide for the float when the latter is displaced from seat 31. When the unit is inverted to drain, the valve still functions as a lower drain.

While the various features of the above invention that have been described, and that are illustrated in the drawings, will be set forth in the following claims as inventive features, it is to be noted that the invention is not necessarily limited to these features and that it encompasses all of the features that have been described both individually and in various combinations.

What is claimed is:

1. A milker comprising a walled chamber with a lower milk exit and upper entry nipples adapted to be connected to teat cups and communicate milk into said chamber, said exit being connectible to a vacuum milk line and having a valved seat adjacent the bottom of said chamber, said chamber having vacuum inlet means that maintains an operating vacuum therein, a float valve on said seat and said valve being pivoted to the milker to rise and expose the exit responsive to the level of milk in said chamber, said valve having curved sides, said nipples extending upwardly from leads into the chamber side wall adjacent the float, and positioned to direct at least a substantial portion of the milk inflow downwardly to below the upper surface of the float tangentially with respect to said sides, whereby said float can rise unimpeded during the inflow of milk.

2. A milker as claimed in claim 1, wherein the bottom wall of the chamber is concave and a stem projects upwardly from said bottom wall near the center thereof, said float having a through passageway that loosely receives said stem, said seat being located off-center in said bottom and said float mounting a valve member that normally cooperates with said seat to close same until said float rises responsive to the milk level in said chamber.

3. A milker as claimed in claim 2, wherein the passageway of said float is slot-shaped and a notched tab extends from one side of the float, a guide pin on said bottom wall adjacent said seat being fitted in the notch of said tub.

4. A milker as claimed in claim 3, wherein a guide is slideably received on said stem and said guide having a limb that extends upwardly in said passageway adjacent said stem.

5. A milker as claimed in claim 4, wherein said exit comprises an outwardly projecting conduit and said conduit, pin and seat are in general alignment with one another.

6. A milker as claimed in claim 2, wherein said chamber is defined by a base and a separable upper enclosure that hermetically seats on said base, said nipples leading into the sides of said enclosure adjacent a lower edge thereof and said nipples extending upwardly between about 5–30° from the vertical.

7. A milker as claimed in claim 6, wherein said enclosure includes a separable air divider cap having teat cup pulsation fittings and a pulsation line inlet, said vacuum inlet means in said enclosure, below said cap, the two inlets being in alignment with one another and with said guide pin.

8. A milker as claimed in claim /7, wherein said inlet means has interior seat means and said cap mounts an air opening with an exterior plug, said exterior plug being interconnected to a valve for said seat means through a displaceable member, said plug being mounted to close the air opening when said inlet means is opened.

9. A milker as claimed in claim 8, wherein said displaceable member is an arm having a central hole and a cooperating stud on the interior of said cap is rockably hinged to the arm through said hole, one end of said arm mounting said valve and the opposite arm end being interconnected to said plug whereby said inlet means is closed by said valve when said opening is open to ambient air.

10. A milker as claimed in claim 8, wherein said stem extends upwardly through the passageway of the float, the central hole in said arm and an aperture in said cap to receive a fastener when the milker is assembled.

11. A milker as claimed in claim 8, wherein said displaceable member is a connection to a disc-shaped valve having a central opening and a cooperating support on the interior of said cap is fitted in said central opening, said plug extending through a side of the cap and connected to said valve, said plug and valve being slideable laterally relative to the cap and said opening being positioned to open and close said inlet means.

12. A milker as claimed in claim 11, wherein said inlet means is comprised by an elbow having an inner mouth that opens adjacent said stem, said elbow having an exterior entrance and located below said cap.

13. A milker as claimed in claim 11, wherein said connection includes a downwardly extending further guide that enters said passageway.

14. A milker comprising a walled chamber with a lower milk exit and upper entry nipples adapted to be connected to teat cups and communicate milk into said chamber, said exit being connectible to a vacuum milk line and having a valved seat adjacent the bottom of said chamber, said chamber having vacuum inlet means adapted to maintain an operating vacuum therein, a float valve on said seat and said valve being pivoted to the milker to rise and expose the exit responsive to the level of milk in said chamber, said valve being generally oval when viewed from the side, said nipples extending upwardly from leads into the chamber side wall adjacent the float and positioned to direct at least a substantial portion of the milk inflow downwardly to below a horizontal centerline of the float, whereby said float can rise unimpeded during the inflow of milk.

15. A milker as claimed in claim 14, wherein said chamber is defined by a base and a separable upper enclosure that hermetically seats on said base, said nipples leading into the sides of said enclosure adjacent the juncture of the base and enclosure.

* * * * *